(12) United States Patent
Kossel et al.

(10) Patent No.: US 12,513,028 B2
(45) Date of Patent: Dec. 30, 2025

(54) ORTHOGONAL IMPEDANCE TUNING AND FEED FORWARD EQUALIZATION FOR SEGMENTED MULTIPLE LEVEL SST TRANSMITTER

(71) Applicant: International Business Machines Corporation, Armonk, NY (US)

(72) Inventors: Marcel A. Kossel, Reichenburg (CH); Carrie Ellen Cox, Apex, NC (US); Eric John Lukes, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 18/333,275

(22) Filed: Jun. 12, 2023

(65) Prior Publication Data

US 2024/0414034 A1    Dec. 12, 2024

(51) Int. Cl.
*H04L 25/12* (2006.01)
*H04L 25/03* (2006.01)

(52) U.S. Cl.
CPC ........ *H04L 25/12* (2013.01); *H04L 25/03343* (2013.01); *H04L 25/03878* (2013.01)

(58) Field of Classification Search
None
See application file for complete search history.

(56) References Cited

U.S. PATENT DOCUMENTS

| | | | |
|---|---|---|---|
| 8,446,173 | B1 | 5/2013 | Faucher et al. |
| 8,588,289 | B2 | 11/2013 | Rane et al. |
| 8,755,428 | B2 | 6/2014 | Agrawal et al. |
| 9,112,550 | B1 * | 8/2015 | Ulrich ............... H04L 25/03343 |
| 10,728,060 | B2 | 7/2020 | Peng et al. |
| 10,924,310 | B2 | 2/2021 | Toprak-Deniz et al. |
| 10,931,249 | B2 | 2/2021 | Rattan et al. |

(Continued)

OTHER PUBLICATIONS

Chen, Shuai et al. "A novel SST transmitter with mutually decoupled impedance self-calibration and equalization." 2011 IEEE International Symposium of Circuits and system (ISCAS). IEEE, Year 2011, pp. 173-176. (Year: 2011).*

(Continued)

*Primary Examiner* — Anh Q Tran
(74) *Attorney, Agent, or Firm* — Patterson + Sheridan, LLP

(57) ABSTRACT

Embodiments of the present disclosure provide systems and methods for implementing separate and orthogonal impedance tuning (Zcal) and feed forward equalization (FFE) operations of a segmented multiple level source-series terminated (SST) transmitter. An SST transmitter output driver comprising a plurality of parallel-connected output driver slices coupled to a data communication link and a multiple-tap FFE unit comprising at least one pre-cursor tap, main tap or post-cursor tap. The system performs impedance tuning within each of the plurality of parallel-connected output driver slices of the output driver. The system performs FFE resolution on the plurality of parallel-connected output driver slices of the output driver by assigning respective ones of the plurality of parallel-connected output driver slices to a specific FFE tap of the of the at least one pre-cursor tap, main tap or post-cursor tap of the FFE unit.

19 Claims, 13 Drawing Sheets

(56) References Cited

U.S. PATENT DOCUMENTS

2008/0120838 A1    5/2008  Clements et al.
2020/0106649 A1*   4/2020  Peng ................. H04L 25/03343

OTHER PUBLICATIONS

Chen, Shuai, et al. "A novel SST transmitter with mutually decoupled impedance self-calibration and equalization." 2011 IEEE International Symposium of Circuits and Systems (ISCAS). IEEE, Year: 2011. pp. 173-176.

M. Kossel et al., "A T-Coil-Enhanced 8.5 Gb/s High-Swing SST Transmitter in 65 nm Bulk CMOS With «-16 dB Return Loss Over 10 GHz Bandwidth," in IEEE Journal of Solid-State Circuits, vol. 43, No. 12, pp. 2905-2920, Dec. 2008, doi: 10.1109/JSSC.2008.2006230.

Kocaman, Namik, et al. "A 3.8 mW/Gbps quad-channel 8.5-13 Gbps serial link with a 5 tap DFE and a 4 tap transmit FFE in 28 nm CMOS." IEEE Journal of Solid-State Circuits 51.4 (2016): 881-892.

Tang, Hanchun, et al. "A 28 Gb/s 2-tap FFE source-series-terminated transmitter in 22 nm CMOS FDSOI." 2018 IEEE International Symposium on Circuits and Systems (ISCAS). IEEE, 2018, pp. 1-4.

Celik, Firat, et al. "A 32-Gb/s PAM-4 SST transmitter with four-tap FFE using high-impedance driver in 28-nm FDSOI." IEEE Transactions on Very Large Scale Integration (VLSI) Systems 29.6 (2021): 1132-1140.

* cited by examiner

800 ⤵

802
Provide a segmented multiple-level source-series terminated (SST) transmitter
The SST transmitter comprising
(i) An output driver comprising a plurality of parallel-connected output driver slices coupled to a data communication link and
(ii) A multiple tap feed forward equalization (FFE) unit comprising at least one pre-cursor tap, main tap, or post-cursor tap

804
Perform impedance tuning within each of the plurality of parallel-connected output driver slices of the output driver

806
Perform FFE resolution on the plurality of parallel-connected output driver slices of the output driver by assigning respective ones of the plurality of parallel-connected output driver slices to a specific FFE tap of the at least one pre-cursor tap, main tap, or post-cursor tap

FIG. 8

ORTHOGONAL IMPEDANCE TUNING AND FEED FORWARD EQUALIZATION FOR SEGMENTED MULTIPLE LEVEL SST TRANSMITTER

BACKGROUND

The present invention relates to digital data processing, and more specifically, to systems and methods for implementing separate and orthogonal impedance tuning (Zcal) and feed forward equalization (FFE) operations of a segmented multiple level source-series terminated (SST) transmitter used with a high-speed data channel or communication link.

A segmented multiple level SST transmitter used for high-speed serial data channel communications can include multiple output driver slices that form an output driver. Typically, SST transmitters include impedance tuning Zcal and FFE capabilities implemented using one of various conventional Zcal and FFE arrangements. Many existing arrangements implement Zcal and FFE together and available Zcal operations can be generally limited by a given FFE unit, or alternatively FFE operations can be generally limited by the Zcal operations. New techniques are needed to implement impedance tuning and FFE operations in SST transmitters.

SUMMARY

Embodiments of the present disclosure are directed to systems and methods for implementing separate and orthogonal impedance tuning (Zcal) and feed forward equalization (FFE) operations of a segmented multiple level source-series terminated (SST) transmitter.

In a disclosed embodiment, a serial data communication system comprises a segmented multiple level SST transmitter comprises an output driver comprising a plurality of parallel-connected output driver slices coupled to a data communication link and a multiple-tap FFE unit comprising at least one pre-cursor tap, main tap or post-cursor tap. The system performs impedance tuning within each of the plurality of parallel-connected output driver slices of the output driver. The system performs FFE resolution on the plurality of parallel-connected output driver slices of the output driver by assigning respective ones of the plurality of parallel-connected output driver slices to a specific FFE tap of the at least one pre-cursor tap, main tap or post-cursor tap of the FFE unit.

In a disclosed embodiment, the impedance tuning comprising fine impedance tuning and coarse impedance tuning. The system performs the fine impedance tuning with a set of binary-weighted parallel-connected header devices and a set of binary-weighted parallel-connected header devices within each of the output drive slices. The system performs coarse impedance tuning with binary weighted groups of driver stages within the output drive slice. The system iteratively performs a combination of fine impedance tuning and course impedance tuning operations to provide an optimal output impedance of the output driver. The output driver includes a set number of the parallel-connected output driver slices and wherein both impedance tuning and FFE resolution are separately implemented based on the set number of the parallel-connected output driver slices, with each of the parallel-connected output driver slices enabled.

A non-limiting method of a disclosed embodiment implements separate and orthogonal impedance tuning and FFE operations for a SST transmitter. An output driver of the SST transmitter comprises a plurality of parallel-connected output driver slices coupled to a data communication link. A multiple-tap FFE unit comprises at least one pre-cursor tap, main tap and post-cursor tap. The system implements impedance tuning within each of the plurality of parallel-connected output driver slices of the output driver. The system implements FFE resolution on the plurality of parallel-connected output driver slices of the output driver by assigning respective ones of the plurality of parallel-connected output driver slices to a specific FFE tap of the at least one pre-cursor tap, main tap or post-cursor tap of the FFE unit. After impedance tuning and FFE resolution of the SST transmitter, a functional data stream is sent to the communication link for normal data communication.

BRIEF DESCRIPTION OF THE DRAWINGS

FIG. 8 is a flow chart of an example method for implementing separate and orthogonal impedance tuning and FFE operations of one or more disclosed embodiments.

DETAILED DESCRIPTION

Figure 1:
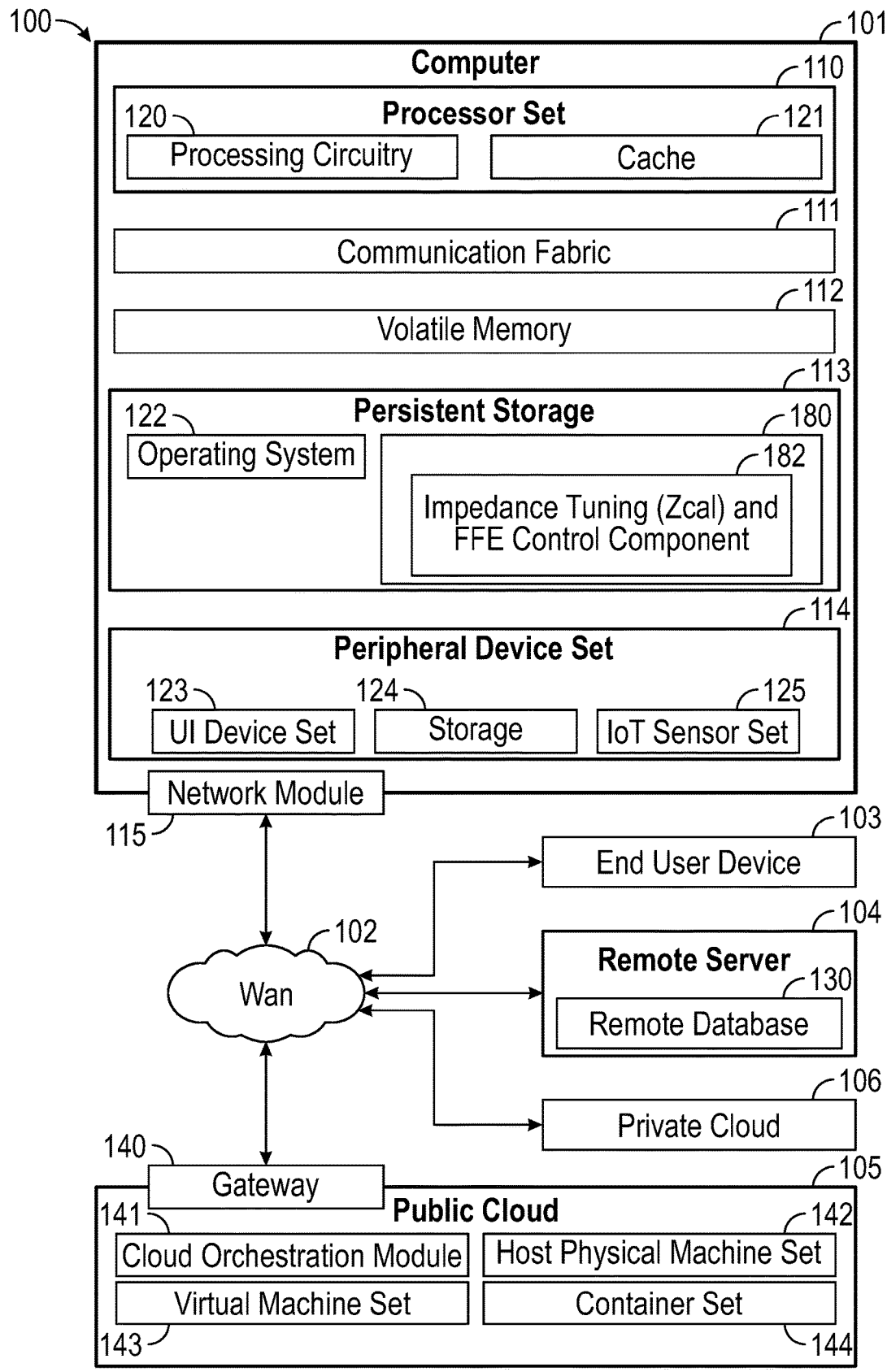
FIG. 1 is a block diagram of an example computer environment for use in conjunction with one or more embodiments for implementing orthogonal impedance tuning (Zcal) and FFE operations of a source-series terminated (SST) transmitter.

Embodiments of the present disclosure provide a method, system, and a segmented multiple level SST transmitter for implementing separate and orthogonal impedance tuning and FFE operations. In a disclosed non-limiting embodiment, a transmitter comprises a segmented multiple level SST transmitter coupled to a data communication link. An output stage driver of the segmented multiple level SST transmitter comprises a plurality of parallel-connected output driver slices forming a voltage mode driver. Self-contained coarse and fine impedance tuning capabilities within the individual driver slices of the output stage driver may be independent from the FFE settings. In one embodiment, the impedance tuning is performed completely within the output slice itself without any interaction from external components (e.g., without any replica biasing circuits providing additional control signals). The impedance tuning process is performed in a digital implementation with parallel instances of scaled voltage mode drivers within a driver slice. In a disclosed non-limiting embodiment, the fine impedance tuning is implemented via Process, Voltage, and Temperature (PVT) header and footer devices of the SST output driver, while binary weighted groups of driver stages within the same driver slice implement the coarse impedance tuning. After impedance tuning and FFE resolution of the SST transmitter, a functional data stream is sent to the communication link for normal data communication.

In a disclosed embodiment, the segmented multiple level SST transmitters uses a Pulse Amplitude Modulation, 4 Levels (PAM4) signal modulation format. The impedance tuning Zcal is implemented completely within the individual slices of the output driver stage performing both coarse and fine tuning. A change of the number of enabled output slices is not required for the impedance tuning Zcal of the multiple level SST transmitter, which is required in some conventional transmitters. The impedance tuning Zcal comprises self-contained coarse and fine impedance tuning that are separate and independent from the FFE settings; that is, Zcal and FFE are orthogonal to each other. In one embodiment, the impedance tuning Zcal is implemented completely within each of the individual slices, so that the total number of enabled slices remains unchanged and used for FFE. In a disclosed embodiment, the fine impedance tuning Zcal is implemented with output driver PVT header/footer devices of the individual slices of the SST driver. In a disclosed embodiment, the coarse impedance tuning Zcal is implemented by binary weighted groups of driver stages within the same driver slice.

In disclosed embodiments, the driver slices are assigned or partitioned into a specific tap of a multi-tap FFE unit (e.g., precursor, main, and postcursor taps). In a disclosed embodiment, the FFE resolution can be implemented by assigning more or less slices to a specific FFE tap, while maintaining the impedance tuning Zcal performed within the driver slices.

Embodiments of the present disclosure provide digital transmitter drivers with parallel instances of scaled voltage mode drivers within a driver slice. The disclosed fully-digital scaled voltage mode drivers enable enhanced supply noise insensitivity with the header and footer devices (e.g., header P-channel field effect transistors (PFETs) and footer N-channel field effect transistors (NFETs) of the segmented sub-driver instances) either fully turned off or fully turned on.

In disclosed embodiments, FFE is performed on a driver slice level itself, while Zcal is performed within the output driver slices. Performing the Zcal within the driver slices of each slice and performing FFE on the driver slice level of disclosed embodiments can enable a less complex implementation, which is particularly advantageous with an FFE unit including at least three FFE taps. In the disclosed embodiment, respective driver slices are selectively assigned to specific FFE taps. In a disclosed embodiment, the FFE resolution is implemented by assigning more or less driver slices to a specific FFE tap while the impedance tuned Zcal is performed independently within a subslice portion of the individual driver slices.

Embodiments of the present disclosure provide voltage mode or push-pull drivers. Voltage-mode drivers can provide enhanced versatility in terms of support of different termination schemes (high-, mid-, low-termination arrangements). In a disclosed embodiment, in the feed-forward equalization process, weighted driver slices are assigned to pre-cursor, main and post-cursor data. In a disclosed embodiment, different weights are used to implement an adjustable tap-weight finite-impulse-response (FIR) filter of a FFE unit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for execution of at least some of the computer code involved in performing the inventive methods, such as an Impedance Tuning (Zcal) and FFE Control Component 182 at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically levelages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In a disclosed embodiment, a transmitter comprises a segmented multiple level source-series terminated (SST) transmitter. An output stage driver of the segmented multiple level SSE transmitter comprises a plurality of parallel-connected output driver slices forming a voltage mode driver. Multiple groups of the plurality of parallel-connected output driver slices are partitioned into selected ones of multiple taps of a feed forward equalization (FFE) unit. Each output drive slice implements self-contained fine impedance tuning and coarse impedance tuning within a sub-slice of each output drive slice. Self-contained impedance tuning means that the impedance tuning is performed completely within the sub-slice or portion of each output drive slice itself, without any interaction from external components such as voltage dividers or replica biasing circuits providing any additional control signals. The output drive slice implements fine impedance tuning with a set of header devices and a set of footer devices. In a disclosed embodiment, the sets of header devices and footer devices are digitally controlled binary-weighted parallel-connected devices. In a disclosed embodiment, the header devices and footer devices are implemented with Field Effect Transistors (FETs). The output drive slice implements coarse impedance tuning with binary weighted groups of driver stages within the same driver slice.

Embodiments of the present disclosure provide fully-digital parallel instances of scaled voltage mode drivers within a driver slice. The multiple scaled voltage mode drivers within the driver slice enable enhanced power supply noise insensitivity because the header and footer devices of the segmented sub-driver instances are either fully turned off or on. The fully-digital multiple scaled voltage mode sub-slice drivers can enable improved performance over conventional analog tuning of header and footer devices based on replica biasing. Moreover, the full segmentation of the pre-driver of disclosed embodiments can enable a wider impedance tuning range than conventional impedance tuning with level shifting or an analog control voltage generated from a replica biasing applied to gates of header and footer driver devices.

In a disclosed embodiment, different weights are used to implement a multiple tap-weight finite-impulse-response (FIR) filter, such as a 3-tap FIR filter. In a disclosed embodiment, selected groups of the multiple driver slices are assigned to specific FFE taps of the multiple tap FFE unit. For example, the FFE unit includes at least three FFE taps: precursor, main and post-cursor taps. In a disclosed embodiment, the FFE resolution is implemented by assigning more or less slices to a specific FFE tap while still maintaining the Zcal performed within the sub-slices of the driver slices. That is, FFE is applied to a constant number of output slices.

Figure 2:
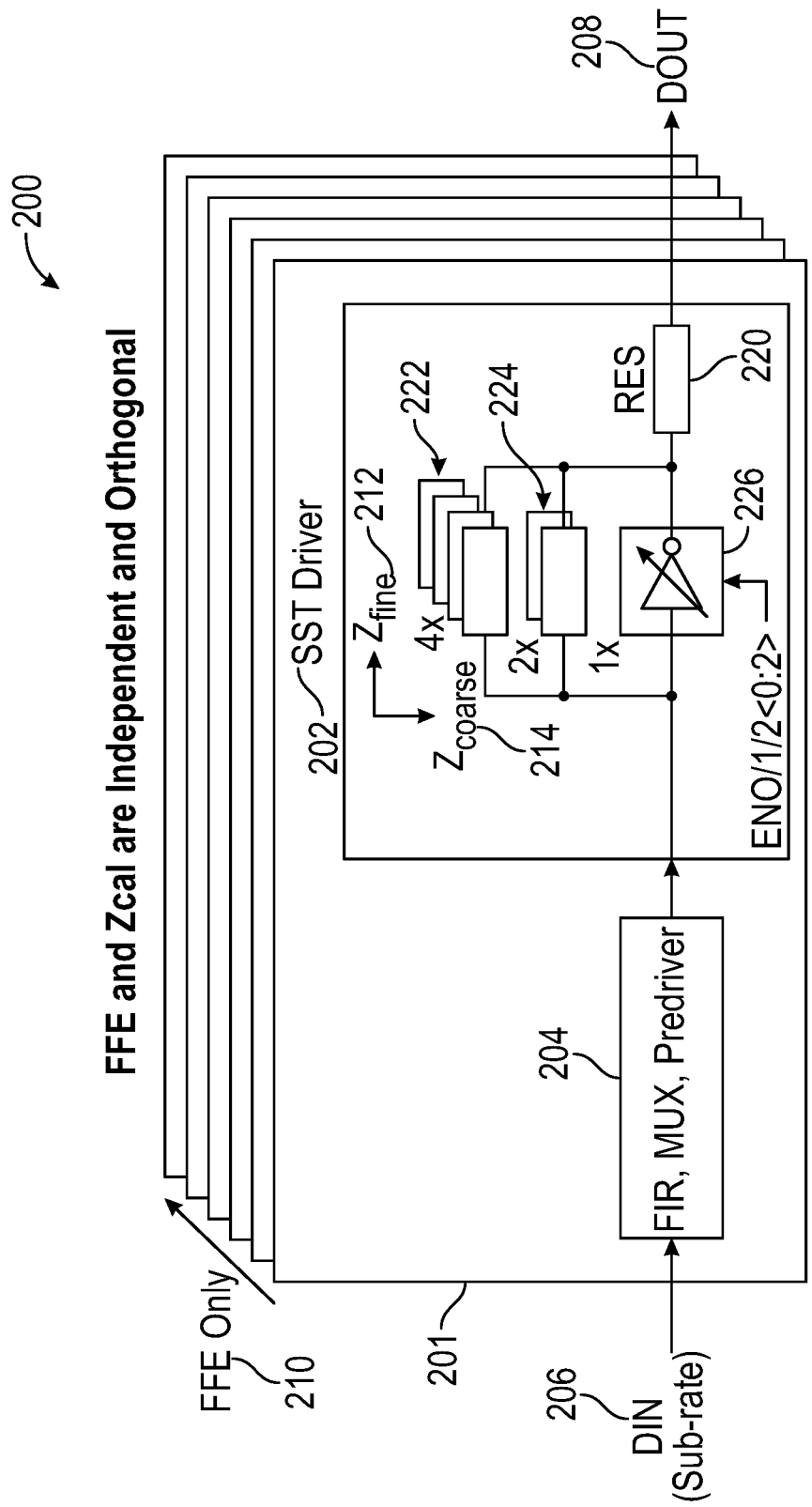
FIG. 2 is a schematic and block diagram illustrating an example segmented multiple level SSE transmitter for implementing separate and orthogonal impedance tuning and FFE operations of one or more disclosed embodiments.

FIG. 2 schematically illustrates an example segmented multiple level source-series terminated (SST) transmitter 200 of one or more disclosed embodiments. The segmented multiple level SSE transmitter 200 enables high speed serial data communication, for example using a Pulse Amplitude Modulation (e.g., PAM4) signal modulation format where the amplitude of the signal can be one of four different levels. For example using PAM4 can allow twice as much information to be transmitted in a given period time as compared to traditional on-off signaling, while adding linearity requirements of some transmitter elements. The segmented multiple level SSE transmitter 200 can be used for example with the computer 101 of FIG. 1 together with the Impedance Tuning (Zcal) and FFE Control Component 182 for implementing impedance tuning and FFE control operations of disclosed embodiments.

A transmitter output driver of the SSE transmitter 200 includes a plurality of parallel-connected driver slices 201. Each driver slice 201 includes an output SST driver stage 202 with an input coupled to a block 204 comprising a FIR filter, Multiplexer, and Predriver. The FIR filter, Multiplexer, and Predriver block 204 receives a data input DIN 206 coupled to the SST driver stage 202 inside each individual driver slice 201. A data output DOUT 208 is provided by the output of the plurality of driver slices 201 forming the transmitter output driver. The transmitter output driver of SSE transmitter 200 includes a selected number of driver slices 201 for example, in a range between 12 and 44 of driver slices 201. The selected number of driver slices 201 remain unchanged (e.g., constant number of enabled driver slices 201) for impedance tuning and FFE resolution operations.

Figure 5:
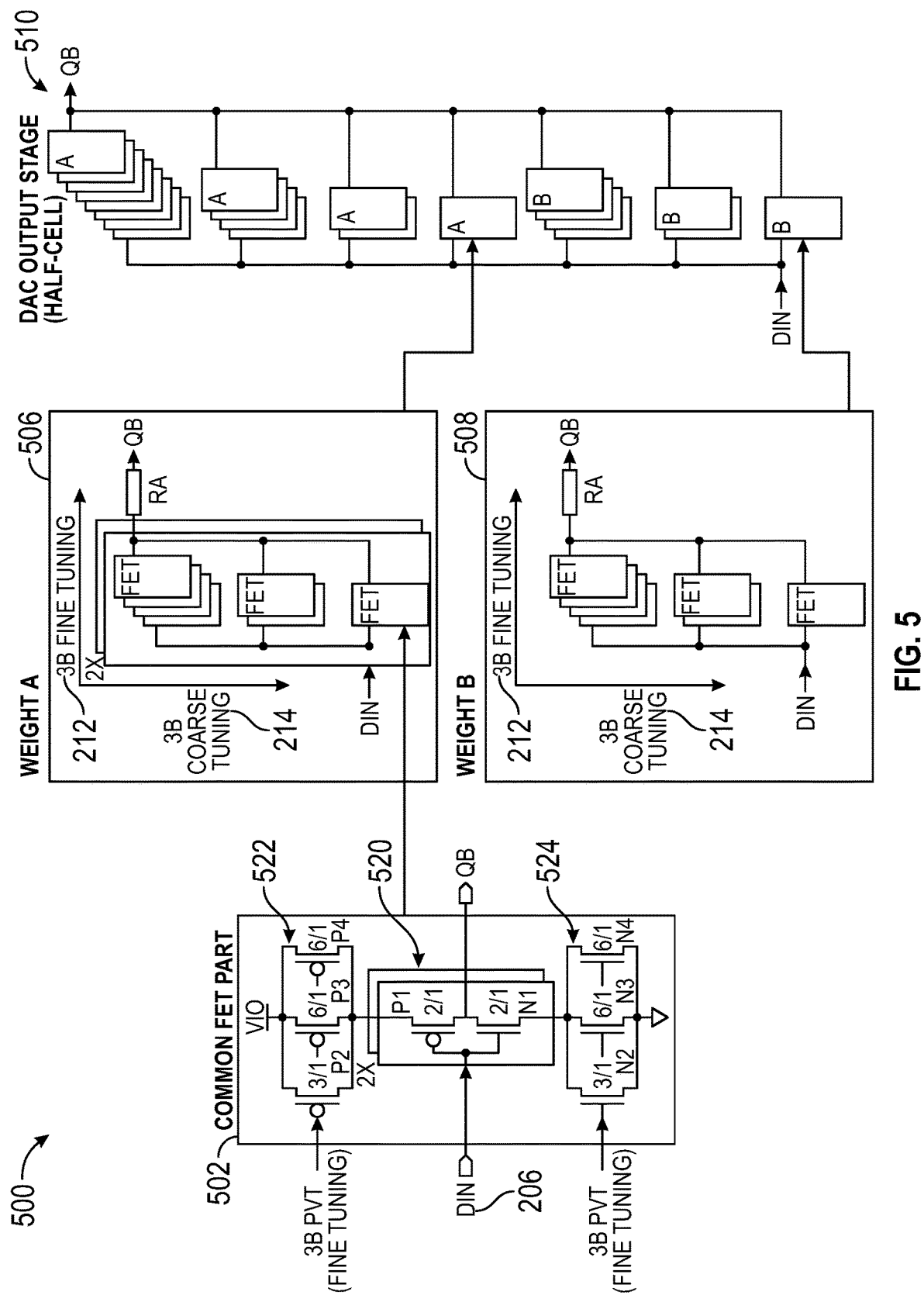
FIG. 5 schematically illustrates example implementation components of the example segmented multiple level SST transmitter of FIGS. 3A, 3B, 3C and 3D of one or more disclosed embodiments.

In a disclosed embodiment, FFE resolution operations indicated by FFE only 210 is implemented on the plurality of driver slices 201. The SSE transmitter 200 implements impedance tuning Zcal operations within the SST driver stage 202 of each driver slice 201 decoupled from FFE operations, thereby providing orthogonal and independent impedance tuning and feed forward equalization operations of disclosed embodiment. The plurality of parallel-connected output driver slices 201 are partitioned into pre-cursor, main, and post-cursor taps of a feed forward equalization (FFE) unit. Fine impedance tuning Zfine 212 and coarse impedance tuning Zcoarse 214 are implemented within the SST driver stage 202 of each output driver slice 201. In a disclosed embodiment, fine impedance tuning Zfine 212 is implemented with a digitally controlled set of binary-weighted parallel-connected header devices and a digitally controlled set of binary-weighted parallel-connected footer devices (e.g., Field Effect Transistors (FETs) such as shown in FIG. 5). In a disclosed embodiment, coarse impedance tuning Zcoarse 214 is implemented with binary weighted groups of driver stages within the same driver slice 201.

In accordance with a disclosed embodiment, SSE transmitter 200 includes full segmentation (i.e., parallel instances of scaled versions of driver circuitries (parallel output driver slices 201 with a linearization resistor 220) enables an effective linear and less steep impedance versus control characteristic, which is easier for calibration. In a disclosed embodiment, multiple digital parallel instances 222, 224, 226 of scaled voltage mode driver stages are provided within the SST driver stage 202 of each output driver slice 201 as shown. For example, the fully digital parallel instances 222 include four (e.g., 4×) parallel sub-driver instances, the fully digital parallel instances 224 include two (e.g., 2×) parallel sub-driver instances, and the fully digital parallel instance 226 includes one (e.g., 1×) sub-driver instance. The multiple fully digital parallel instances 222, 224, 226 enable enhanced supply noise insensitivity with header and footer devices of the segmented sub-driver instances digitally controlled to be either fully turned off or on.

FIGS. 3A, 3B, 3C and 3D together provide a schematic and block diagram illustrating an example segmented multiple level SST transmitter 300 or SST transmitter 300 for implementing separate and orthogonal impedance tuning (Zcal) and a feed forward equalization (FFE) of one or more disclosed embodiments. In FIGS. 3A, 3B, 3C and 3D, the same reference numbers are used for identical or similar components of the SST transmitter 300 as used for the SST transmitter 200 of FIG. 2.

Figure 3A:
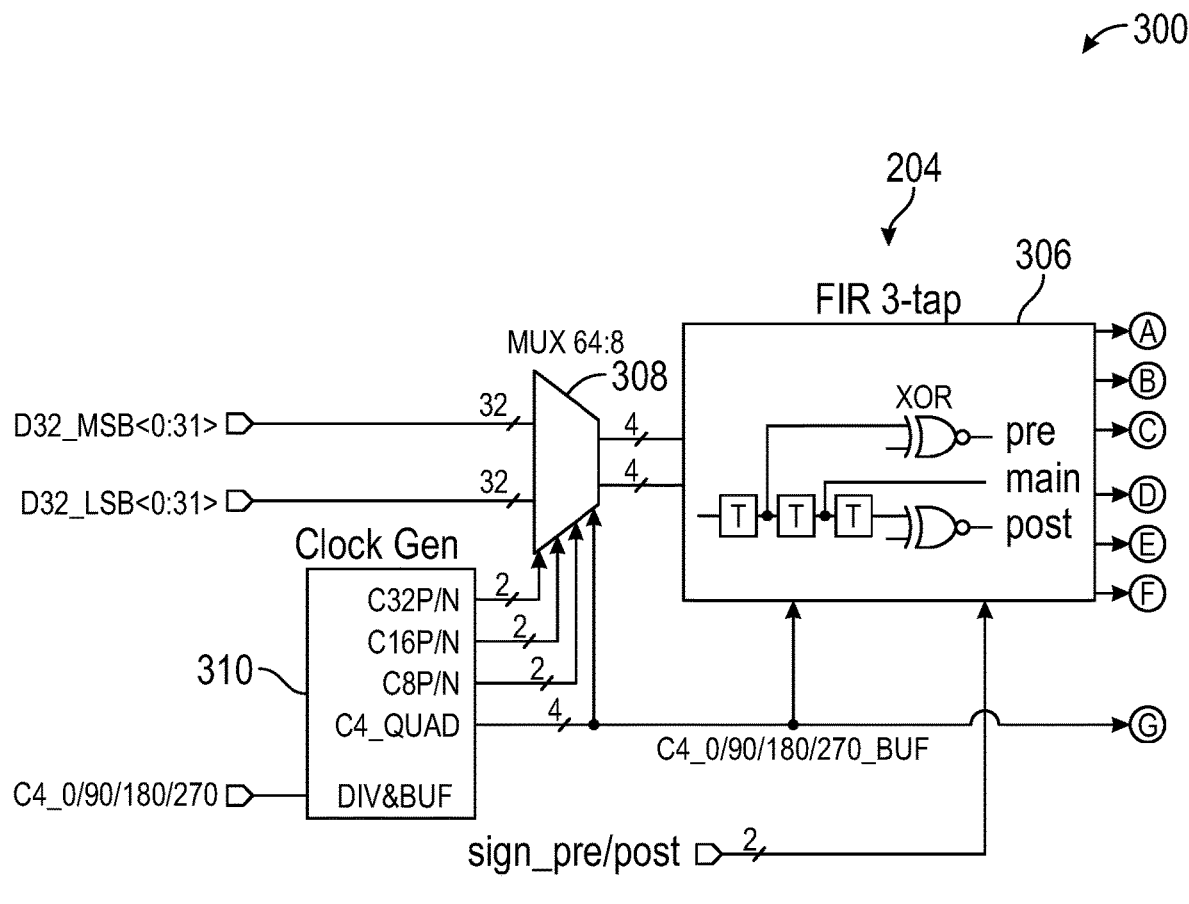
FIGS. 3A, 3B, 3C and 3D together provide a schematic and block diagram illustrating an example segmented multiple level SST transmitter for implementing separate and orthogonal impedance tuning and FFE operations of one or more disclosed embodiments.

Referring to FIG. 3A, the SST transmitter 300 receives input data, such as 32-bits Most Significant Bit (MSB) and 32-bits Least Significant Bit (LSB) input at inputs D32_MSB<0:31> and D32_LSB<0:31> coupled to a FIR filter 306 via a multiplexer 308 (e.g., MUX 64:8) of block 204. As shown, the example FIR filter 306 is a 3-tap filter including a pre-cursor tap, a main tap and a post-cursor tap. The 3-tap FIR filter 306 is configured to provide high-pass filter characteristics to implement FFE resolution 210 to effectively compensate for a channel transfer function and reduce the Inter-Symbol Interference (ISI) introduced by the high-speed serial link channel receiving data output 208 DOUT. The pre, main and post tap outputs of the example FIR filter 306 (e.g., indicated at respective connecting points A, B, C, D, E, F) are coupled to example FFE and Clock Selection circuits 302 illustrated in FIG. 3B. Various other configurations for the FIR filter 306 can be provided; for example a FIR filter including additional pre-cursor taps and post-cursor taps.

In FIG. 3A, a clock generation (Clock Gen) buffer 310 receives quadrature clock signals C4_0/90/180/270 (e.g., identical frequency quadrature clock signals: CLK phase 0°, CLK phase 90°, CLK phase 180° and CLK phase 270°). The clock generation buffer 310 provides the quadrature clock signals C4_0/90/180/270 to the multiplexer 308 and the 3-tap FIR filter 306, and to the FFE and Clock Selection circuits 302 in FIG. 3B (indicated at connecting point G). Tap selection inputs PRE/MAIN/POST <0:6> are provided to the FFE and Clock Selection circuits 302 in FIG. 3B (indicated at connecting point H).

Figure 3B:
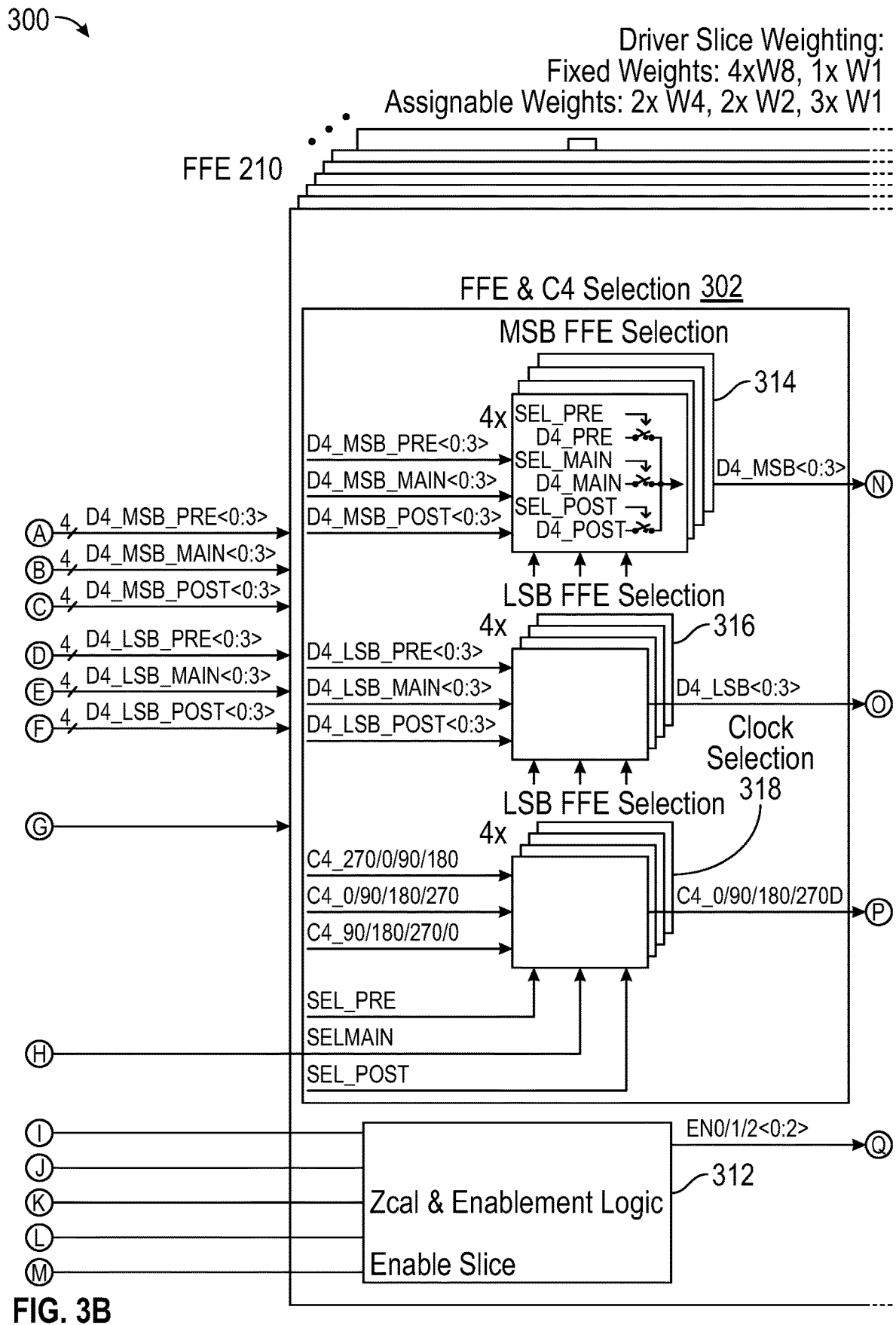
Figure 3C:
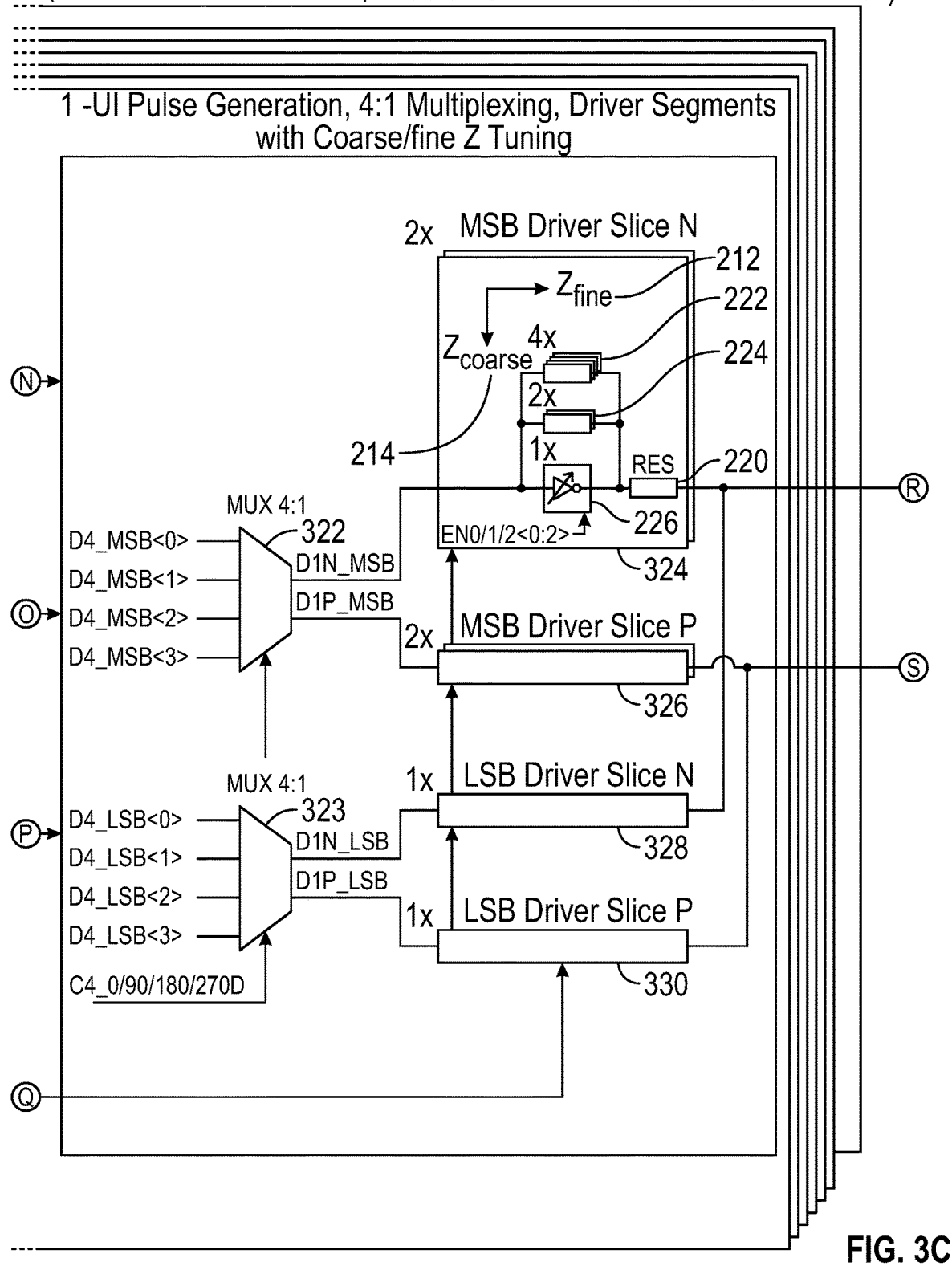

Referring to FIGS. 3B and 3C, the SST transmitter 300 includes an Impedance Calibration Zcal and Enablement logic 312, which receives Zcal vectors shown in FIG. 3A (indicated at respective connecting points I, J, K, L, M). The Impedance Calibration Zcal and Enablement logic 312 provides enable inputs (indicated at connecting point Q) to FIG. 3C, enabling the impedance calibration process of disclosed embodiments. The illustrated FFE and Clock Selection logic 302 comprise MSB FFE selection logic 314. LSB FFE selection logic 316, and Clock Selection logic 316. The MSB FFE selection logic 314 receives respective outputs D4_MSB Pre<0:3>, Main<0:3> and Post<0:3> of the example FIR filter 306. The LSB FFE selection logic 316 receives respective outputs D4_LSB Pre<0:3>, Main<0:3> and Post<0:3> of the example FIR filter 306. The Clock Selection logic 318 receives input quadrature clock signals C4_0/90/180/270 (indicated at connecting point G) and provides output quadrature clock signals C4_0/90/180/270 (indicated at connecting point P).

In accordance with disclosed embodiments, using the full segmentation including parallel instances of scaled SST driver stages 202 within each driver slice 201 enables linear control characteristics, enabling effective impedance tuning calibration. Implementing impedance tuning within the scaled SST driver stages 202 within each driver slice 201 that is decoupled from FFE resolution operations of a disclosed embodiments enables orthogonal, separate and independent impedance tuning and feed forward equalization resolution operations.

In FIG. 3C, a first multiplexer 322 receives respective data inputs D4_MSB <0,1,2,3> and a second multiplexer 323 receiving respective D4_LSB <0,1,2,3> (indicated at connecting points N, O). The multiplexer 322 provides DIN_MSB and D1P_MSB inputs respectively to a first driver segment or driver slice N 324 and a second MSB driver slice P 326 and a first LSB driver slice N 328 and a second LSB driver slice P 330. The quadrature clock signals C4_0/90/180/270 of FIG. 3B (indicated at connecting point P) are coupled to the multiplexers 322, 323. The impedance calibration Zcal and Enablement logic 312 (shown in FIG. 3B) provides enable inputs EN0/1/2<0:2> (indicated at connecting point Q) to each of the first MSB driver slice N 324, the second MSB driver slice P 326, the first LSB driver slice N 328 and the second LSB driver slice P 330 to enable impedance tuning Zcal within the scaled SST driver stages 202 within each driver slice 201.

In a disclosed embodiment, the output stage of SST transmitter 300 is configured to provide protection against electrostatic discharges (ESD), for example to enable proper operation in an electromagnetic environment by limiting the reception of electromagnetic energy that may cause physical damage.

Figure 3D:
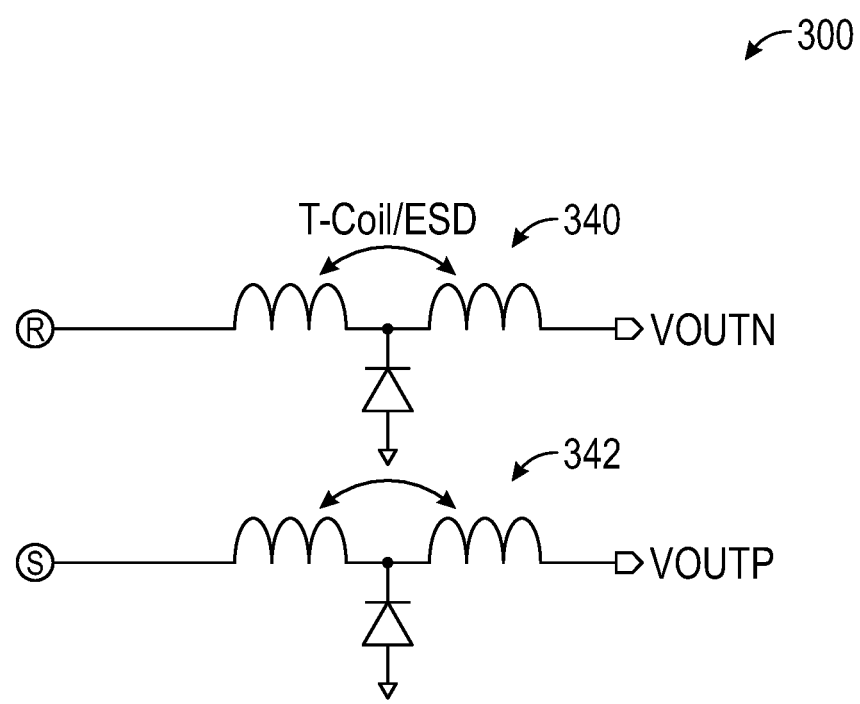

Referring to FIG. 3D, a pair of combined T-coils and ESD devices 340, 342 are connected to the differential output signals VOUTN, VOUTP of the SST transmitter 300, for example to improve the transmitter return loss and enable operation at higher data rates. In a disclosed embodiment as shown, the combined T-coils and ESD devices 340, 342 comprise two coupled inductors with the ESD protection devices connected to the center tap for example having low holding voltage, low on-resistance and the relatively low parasitic capacitance. In operation the T-coil can cancel the parasitic capacitance of the ESD-protection devices and separate the parasitic capacitances of the SST output stages from the actual output port of the transmitter over a wide frequency range. In a disclosed embodiment, the ESD protection devices of the combined T-coils and ESD devices 340, 342 include silicon-controlled rectifiers (SCRs).

Figure 4A:
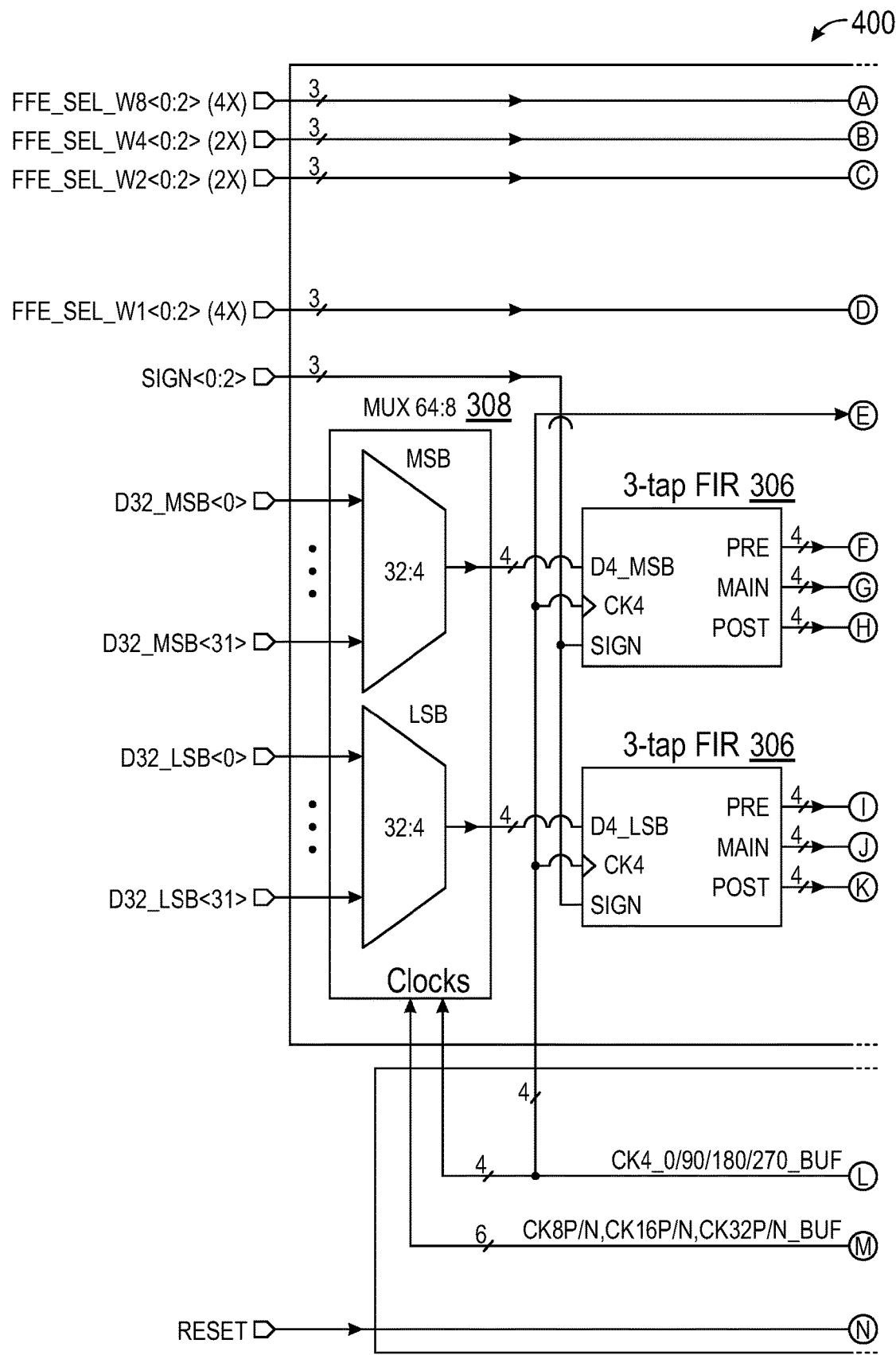
FIGS. 4A, 4B, and 4C together illustrate example implementation details of the segmented multiple level SST transmitter of FIGS. 3A, 3B, 3C and 3D of one or more disclosed embodiments.
Figure 4B:
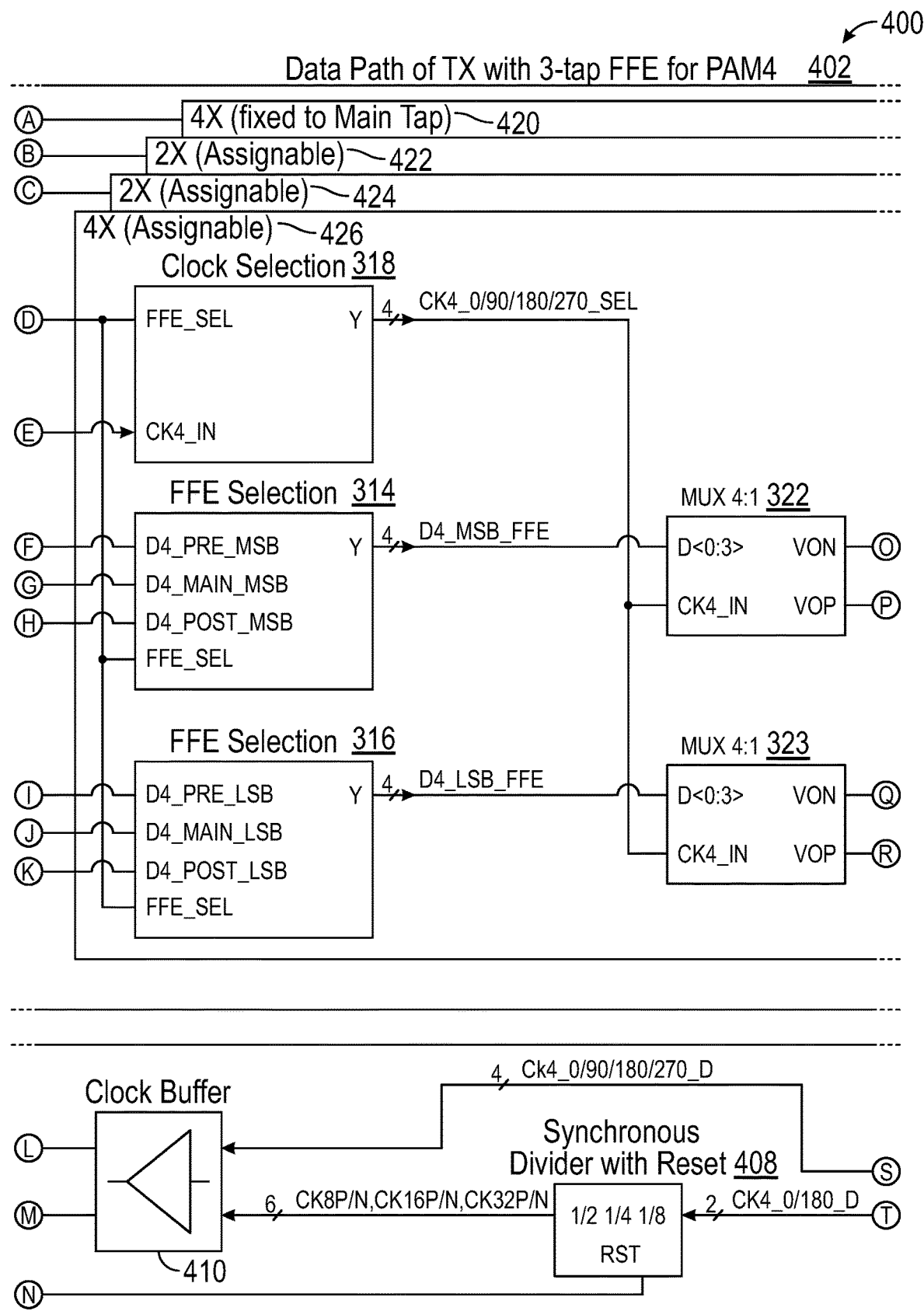
Figure 4C:
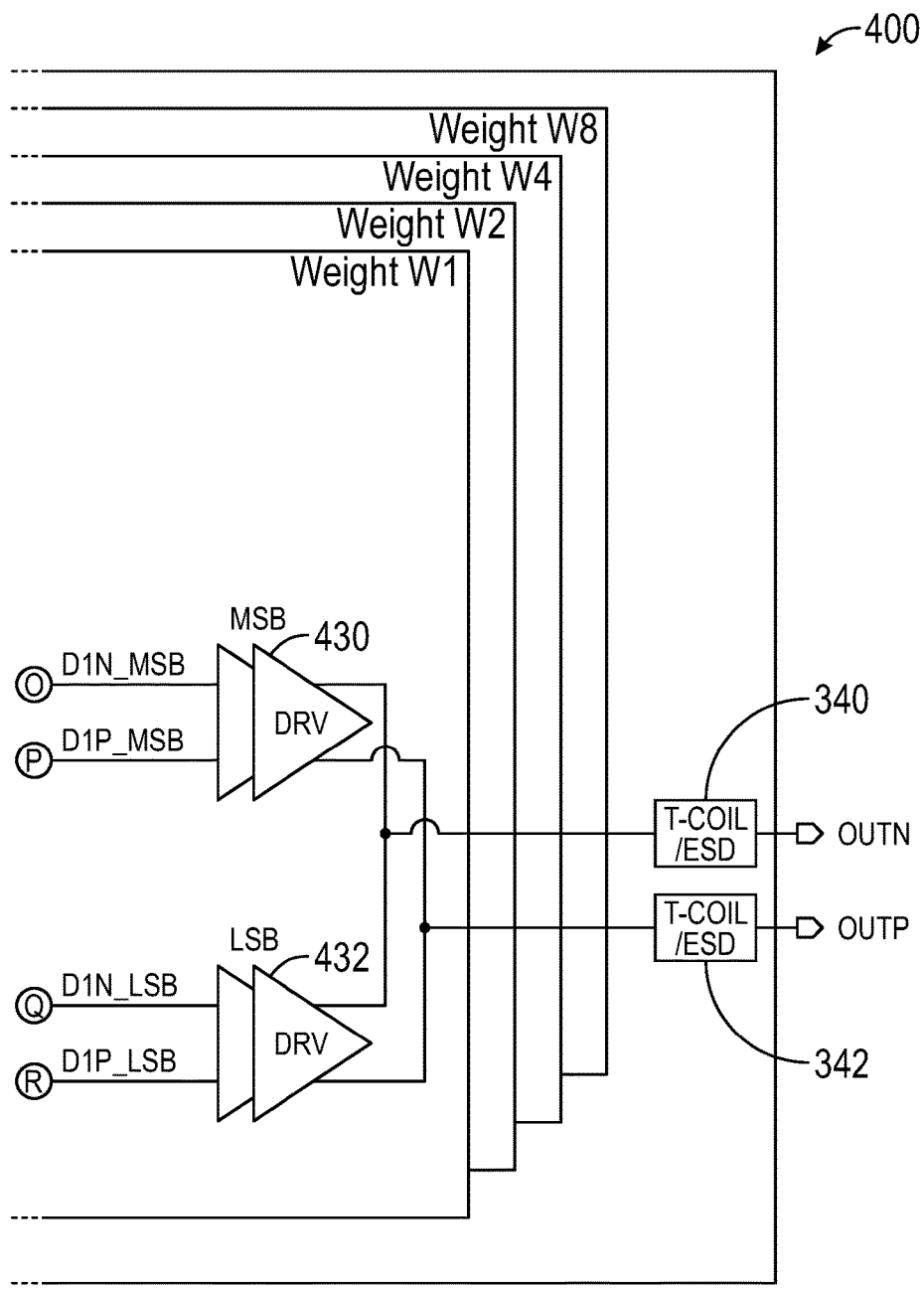
Figure 4C:
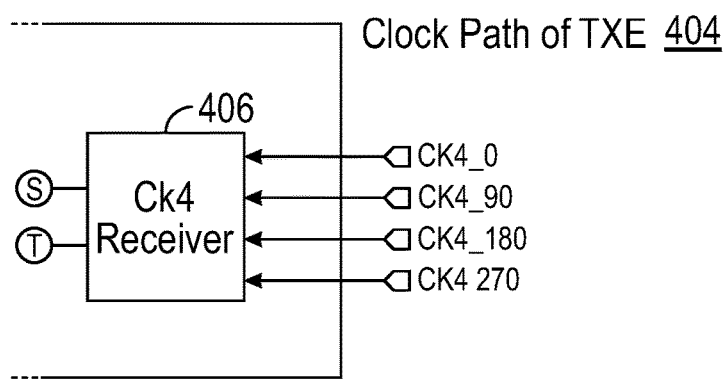

FIGS. 4A, 4B, and 4C together illustrate an example implementation details of a segmented multiple level SST transmitter 400 corresponding to the segmented multiple level SST transmitter 300 of disclosed embodiments. In 4A, 4B, and 4C, the same reference numbers are used for identical or similar components of the SST transmitter 400 as used for the SST transmitter 300 of FIGS. 3A, 3B, 3C and 3D.

FIGS. 4A, 4B, and 4C together provides an example data path 402 of TX with a 3-tap FFE implementation for PAM4 signal modulation format for the illustrated segmented multiple level SST transmitter 400. In FIG. 4C, a clock path 404 of TX starts at a clock receiver (Ck4 Receiver) 406. The clock receiver (Ck4 Receiver) 406 couples in-phase quadrature clock signals CK4_0/180 or in-phase 0° and 180° clock signals (indicated at connecting point T) to a Synchronous Divider with Reset 408 in FIG. 4B and couples the quadrature clock signals C4_0/90/180/270 (indicated at connecting point S) to a Clock Buffer 410 in FIG. 4B. In FIG. 4B, the Synchronous Divider with Reset 408 divides the CK4_0/180_D by ½, ¼ and ⅛ and couples divided clock signals CK8P/N, CK16P/N, and CK32P/N to the Clock Buffer 410. The Clock Buffer 410 couples the quadrature clock signals C4_0/90/180/270 and the divided clock signals CK8P/N, CK16P/N, and CK32P/N to a multiplexer MUX 64:8 308 in FIG. 4A (indicated at respective connecting points L and M). A reset input RESET (indicated at connecting point N) is coupled to the Synchronous Divider with Reset 408 in FIG. 4B.

In FIG. 4A, FFE Selection weights control inputs FFE_SEL_W8<0:2> (4×), FFE_SEL_W4<0:2> (2×), FFE_SEL_W2<0:2> (2×), FFE_SEL_W1<0:2> (4×) (indicated at respective connecting points A, B, C, D) are coupled to respective fixed and assignable FFE taps as shown in FIG. 4B. In FIG. 4B, the control FFE Selection inputs provide respective weight control including four (4×) FFE taps 420 fixed to the Main tap, two assignable (2×) FFE taps 422 and 424 and four assignable (4×) FFE taps 426, as shown in FIG. 4B, A corresponding weight of multiple weights W8, W4, W2 and W1 are shown in FIG. 4C for the fixed (4×) FFE taps 420, the assignable (2×) FFE taps 422 and 424 and the four assignable (4×) FFE taps 426. Each of illustrated assignable (2×) FFE taps 422 and 424 and the four assignable (4×) FFE taps 426 include respective FFE Selection 314, FFE Selection logic 316 and the Clock Selection logic 318 as shown in FIG. 4B.

FIG. 4A, the SST transmitter 400 receives input data including 32-bits MSB and 32-bits LSB inputs at respective inputs D32_MSB<0> through D32_MSB<31> and D32_LSB<0> through D32_LSB<31> coupled to the multiplexer MUX 64:8 308. As shown in FIG. 4A, the 64:8 multiplexer 308 is implemented by a pair of multiplexers 308 including MSB multiplexer 32:4 and an LSB multiplexer 32:4. As shown in FIG. 4A, a pair of 3-tap FIR filters 306 are respectively coupled to the MSB multiplexer 32:4 and LSB multiplexer 32:4, receiving respective multiplexed data inputs, an input SIGN<0:2>, and the quadrature clock signals C4_0/90/180/270 (indicated at the connecting point L from clock buffer 410 in FIG. 4B).

Referring to FIGS. 4A and 4B, the respective outputs of MSB 3-tap FIR filter 306 and LSB 3-tap FIR filter 306 are respectively coupled to respective blocks FFE Selection 314 and FFE Selection logic 316 as shown in FIG. 4B (respectively indicated at connecting points F, G, H and I, J, K). The FFE Selection 314 and FFE Selection logic 316 are coupled to a pair of multiplexers 322, 323, which respectively receive an input D4_MSB_FFE and D4_LSB_FFE. The Clock Selection logic 318 receives an FFE_SEL input (indicated at connecting point D) and input quadrature clock signals C4_0/90/180/270 (indicated at connecting point E). The Clock Selection logic 318 provides the quadrature clock signals C4_0/90/180/270 to the multiplexers 322, 323. The multiplexers 322, 323, respectively provide data inputs DIN_MSB and DIP_MSB and DIN_LSB and DIP_LSB (indicated at connecting points O, P and Q, R) to a pair of output drivers MSB drivers 430 and LSB drivers 432 as shown in FIG. 4C. The driver outputs output drivers MSB drivers 430 and LSB drivers 432 are coupled to the illustrated pair of combined T-coils and ESD devices 340, 342 (described-above with respect to the SST transmitter 300), providing the differential signal outputs VOUTN, VOUTP of the SST transmitter 400.

FIG. 5 schematically illustrates example implementation components 500 optionally used in the example segmented multiple level SST transmitters 300, 400 of disclosed embodiments. The example implementation components 500 include an example driver circuit 502, a scaled SST driver stage 506 (e.g., with applied Weight A) a scaled SST driver stage 508 (e.g., with applied Weight B), and a digital-to-analog (DAC) output stage 510. In a disclosed embodiment, the example driver circuit 502 illustrates an example implementation of a circuit that can be used to implement scaled voltage mode driver stages, such as the scaled voltage mode driver stages 222, 224, 226 as shown in FIG. 2, within a given scaled SST driver stage 202 of each output driver slice 201.

As shown in FIG. 5, the example driver circuit 502 includes a pair of series-connected data driver devices 520 coupled between header devices 522 and footer devices 524. A data input DIN 206 is coupled to a control input of the series-connected data driver devices 520, which include a pair of transistors P1 and N1 (e.g., a P-channel field effect transistor (PFET) P1, and an N-channel field effect transistor (NFET) N1. A common connection of the series-connected data driver PFET P1 and NFET N1 520 provides a data output QB. The header devices 522 includes a plurality of parallel-connected header devices P2, P3, P4 (e.g., parallel-connected header PFETs). The footer devices 524 includes a plurality of parallel-connected footer devices N2, N3, N4 (e.g., parallel-connected footer NFETs). In operation, the calibrated header PFETs and the footer NFETs of the driver circuit 502 are either fully turned off or on.

As shown, the scaled SST driver stage 506 (e.g., with applied Weight A) and the scaled SST driver stage 508 (e.g., with applied Weight B), for example correspond to the scaled SST driver stage 202 as shown in FIG. 2 provided within each output driver slice 201. The scaled SST driver stage 506 (e.g., with applied Weight A) and the scaled SST driver stage 508 (e.g., with applied Weight B) illustrates the impedance calibration Zcal process including fine impedance tuning 212 Zfine and coarse impedance tuning Zcoarse of disclosed embodiments. In a disclosed embodiment, each of the multiple blocks FET shown in both the scaled SST driver stage 506 and the scaled SST driver stage 508 are implemented using the example driver circuit 502. The scaled SST driver stage 506 (e.g., with applied Weight A) and the subslice scaled SST driver stage 508 (e.g., with applied Weight B) are applied to the DAC output stage 510 which receives the data input DIN and provides the data output QB.

Figure 6:
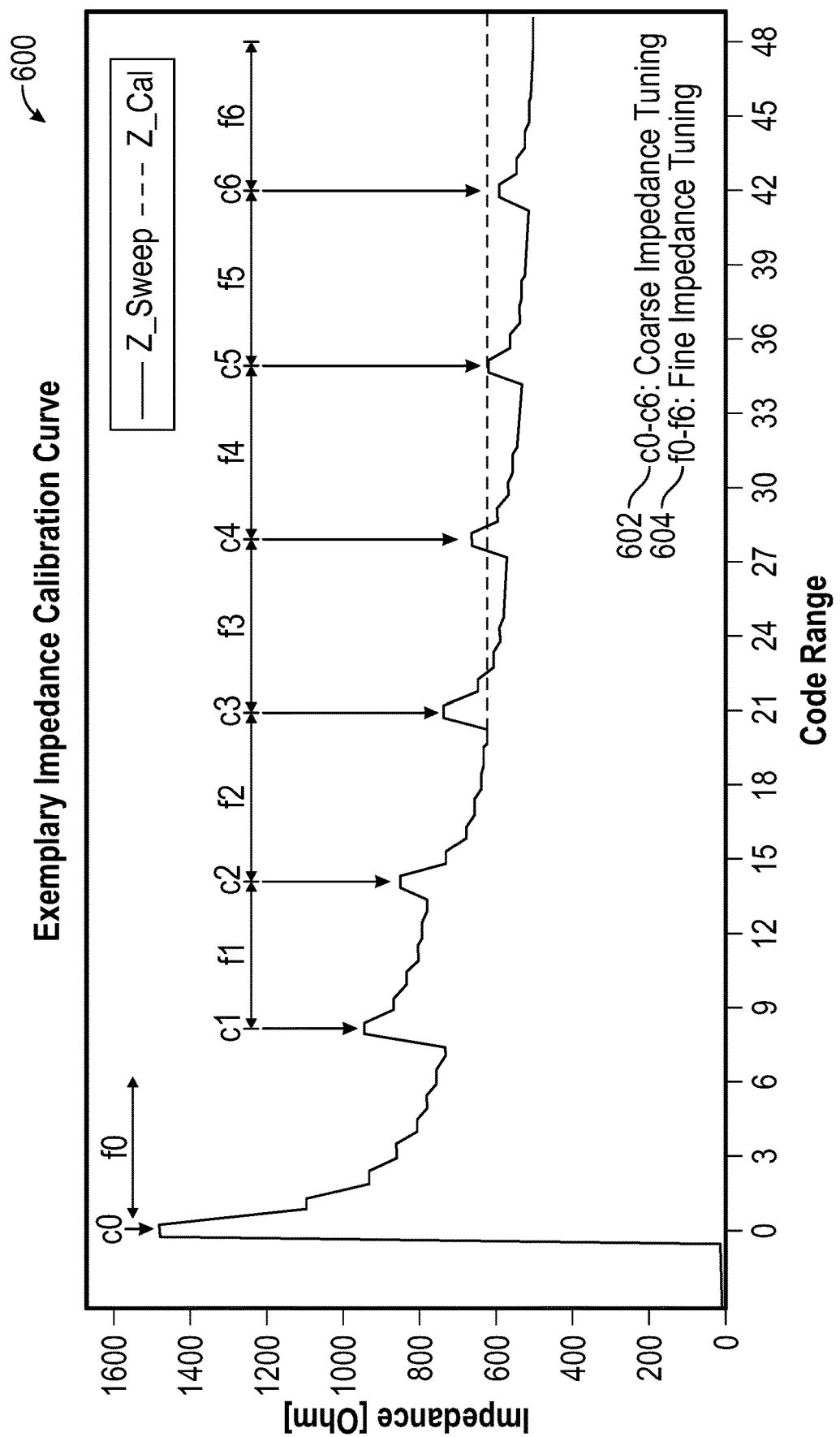
FIG. 6 illustrates an example impedance calibration Zcal curve illustrating fine tuning and coarse tuning operations responsive to control codes iteratively applied to an output driver of an example segmented multiple level SST transmitter of one or more disclosed embodiments.

FIG. 6 provides an example impedance calibration Zcal curve 600 illustrating fine tuning and coarse tuning operations responsive to control codes iteratively applied to an output driver an example segmented multiple level SST transmitter of disclosed embodiments. The example impedance calibration Zcal curve 600 is illustrated with an arbitrary impedance along a vertical axis and an arbitrary code range illustrated relative a horizontal axis. The example impedance calibration Zcal curve 600 illustrates the impedance calibration Zcal process including fine impedance tuning 212 Zfine process and coarse impedance tuning 214 Zcoarse process.

In a disclosed embodiment, performing the course impedance tuning 214 Zcoarse comprises applying a control code to binary weighted groups of the parallel-scaled voltage mode driver stages within the driver slice 201. As shown in FIG. 6, the coarse impedance tuning 214 Zcoarse process includes control code represented by applied c0-c6 for example applied to binary weighted groups of the parallel scaled voltage mode driver stages, such as the scaled voltage mode driver stages 222, 224, 226 as shown in FIG. 2, within the subslice 202 of each output driver slice 201.

In a disclosed embodiment, performing the fine impedance tuning 212 Zfine comprises applying a control code to control a set of output driver header and footer devices of each output driver slice 201. As shown in FIG. 6, the fine impedance tuning 212 Zfine process includes applied control code represented by code ranges 604 f0-f6 for example applied to header PFETs and the footer NFETs of the driver circuit 502 of FIG. 5. In a disclosed embodiment, the driver circuit 502 implement the scaled voltage mode driver stages within the subslice 202 of each output driver slice 201. For example, the driver circuit 502 implement each FET driver stage of corresponding scaled voltage mode driver stages 222, 224, 226 within the subslice 202 of each output driver slice 201 as illustrated in FIG. 2 and FIG. 5. In the fine impedance tuning 212 Zfine process, for example control code represented by code ranges 604 f0-f6 is applied to a set of the header PFETs 522 and the footer NFETs 224 of the driver circuit 502. The horizontal dashed line represents the target impedance of the driver slice. There are several intersections with the impedance curve. The objective of the impedance calibration is to select a code for which the intersection is closest to a plateau of the impedance curve. In this exemplary waveform the most-right intersection is to be selected as its intersection is closest to a horizontal plateau of the impedance curve, which represents the actual impedance value for that specific code.

Figure 7:
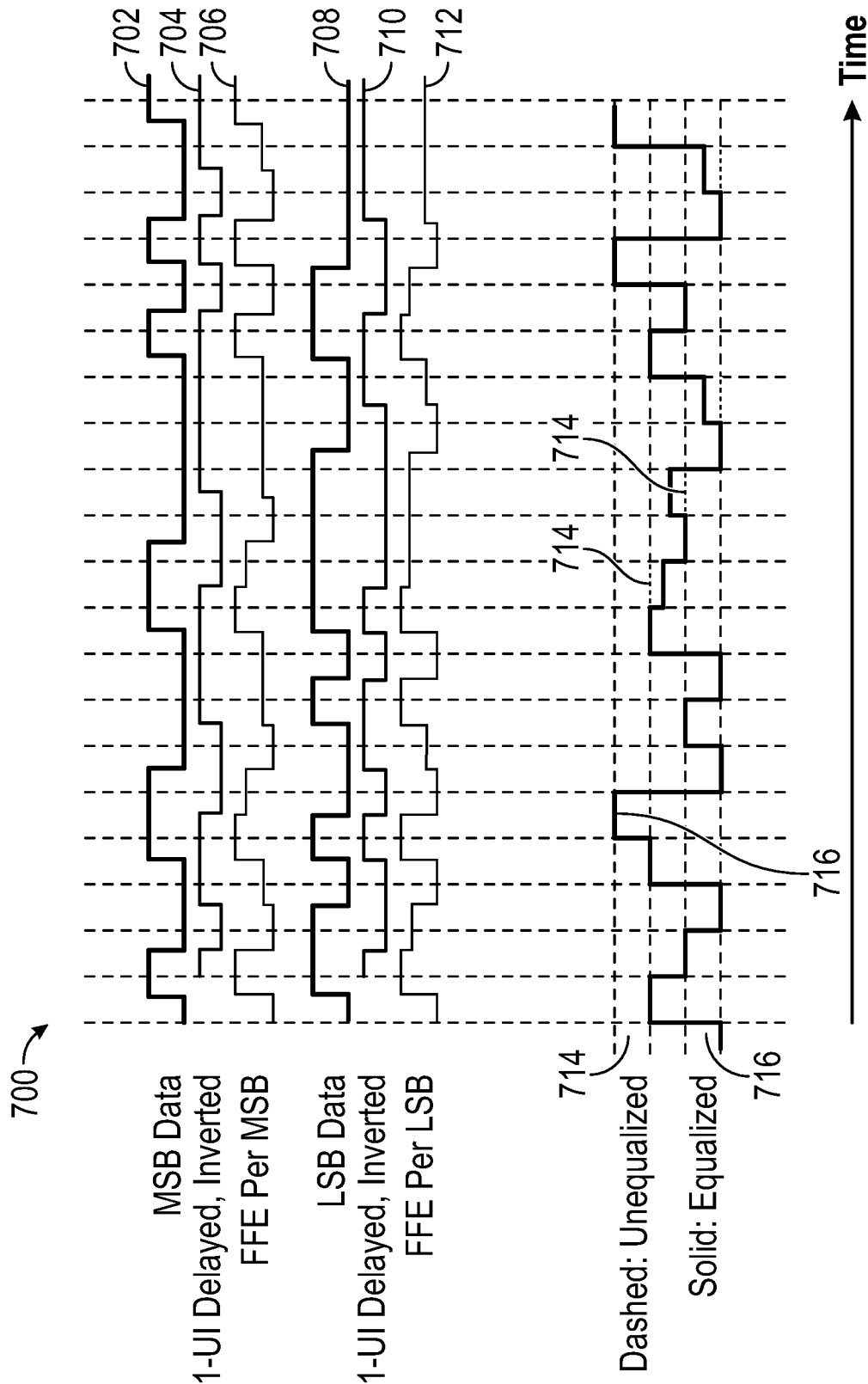
FIG. 7 illustrates example FFE waveforms for PAM4 signaling of an example segmented multiple level SST transmitter of one or more disclosed embodiments.

FIG. 7 illustrates example FFE waveforms 700 for PAM4 signaling of the example segmented multiple level SST transmitter 300 of one or more disclosed embodiments. As shown, example waveform 706 FFE Per MSB includes four different signal amplitude levels for the Pulse Amplitude Modulation, 4 Levels (PAM4) signal modulation format corresponding to example waveform 702 MSB Data and example waveform 704 1-U1 (1-Unit Interval in time) Delayed and Inverted. Similarly, example waveform 712 FFE Per LSB includes the four different signal amplitude levels for the PAM4 signal modulation format of example waveform 708 LSB Data and example waveform 710 1-bit-Unit Delayed and Inverted. Waveform 714 Unequalized illustrates in dotted line example portions of a four level unequalized signal. Waveform 716 Equalized illustrates an example four level equalized signal output of SST transmitter 300 in solid line of disclosed embodiments. The equalization performs a de-emphasis of the PAM4 symbols affected by inter-symbol interference.

FIG. 8 illustrates an example method 800 for implementing separate and orthogonal impedance tuning and FFE operations of one or more disclosed embodiments. Method 800 can implemented with the example segmented multiple level SST transmitter 300 used in conjunction with the computer 101 and cloud environment of the computing environment 100 of FIG. 1.

At block 802, a segmented multiple level source-series terminated (SST) transmitter is provided, for example corresponds to the segmented multiple level SST transmitter 300 of disclosed embodiments. The segmented multiple level SST transmitter comprises an output driver comprising a plurality of parallel-connected output driver slices (e.g., driver slices 201) coupled to a data communication link and (ii) a multiple-tap feed forward equalization (FFE) unit comprising at least one pre-cursor tap, main tap, or post-cursor tap (e.g., 3-tap FIR filter 306).

At block 804, impedance tuning is performed within each of the plurality of parallel-connected output driver slices of the output driver. At block 806, FFE resolution is performed on the plurality of parallel-connected output driver slices of the output driver. The FFE resolution operations include assigning respective ones of the plurality of parallel-connected output driver slices to a specific FFE tap of the at least one pre-cursor tap, main tap or post-cursor tap of the FFE unit.

While the foregoing is directed to embodiments of the present invention, other and further embodiments of the invention may be devised without departing from the basic scope thereof, and the scope thereof is determined by the claims that follow.

What is claimed is:

1. A method comprising:
providing (i) a segmented multiple level source-series terminated (SST) transmitter comprising an output driver comprising a plurality of parallel-connected output driver slices coupled to a data communication link and (ii) a multiple-tap feed forward equalization (FFE) unit comprising at least one pre-cursor tap, main tap, or post-cursor tap;
performing impedance tuning within each of the plurality of parallel-connected output driver slices of the output driver, the impedance tuning further comprising:
performing fine impedance tuning; and
performing coarse impedance tuning within each of the plurality of parallel-connected output driver slices; and
performing FFE resolution on the plurality of parallel-connected output driver slices of the output driver by assigning respective ones of the plurality of parallel-connected output driver slices to a specific FFE tap of the at least one pre-cursor tap, main tap or post-cursor tap of the multiple-tap FFE unit.

2. The method of claim 1, wherein performing the fine impedance tuning comprises applying control code to control a set of output driver header and footer devices of each output driver slice, wherein the controlled output driver header and footer devices are fully turned on or off.

3. The method of claim 2, wherein the set of controlled output driver header and footer devices comprises Process, Voltage, and Temperature (PVT) header and footer output driver header and footer transistors.

4. The method of claim 1, wherein each output driver slice comprises a plurality of parallel-scaled voltage mode driver stages within each driver slice and wherein performing the coarse impedance tuning comprises applying a control code to binary weighted groups of the parallel-scaled voltage mode driver stages within the driver slice.

5. The method of claim 1, wherein performing the fine impedance tuning and performing the coarse impedance tuning within each of the plurality of parallel-connected output driver slices is separate and independent from the performing the FFE resolution.

6. The method of claim 1, wherein performing the impedance tuning comprises iteratively performing a combination of fine impedance tuning and coarse impedance tuning operations to provide an optimal output impedance of the output driver.

7. The method of claim 1, wherein the performing FFE resolution is separate and independent from performing the impedance tuning within each output driver slice.

8. The method of claim 1, wherein the output driver includes a set number of the parallel-connected output driver slices and wherein both the impedance tuning and the FFE resolution are separately performed based on the set number of the parallel-connected output driver slices, with each of the parallel-connected output driver slices enabled.

9. The method of claim 1, wherein the segmented multiple level SST transmitter transmits a functional serial data stream with a Pulse Amplitude Modulation, 4 Levels (PAM4) signal modulation format to the data communication link after completing the impedance tuning and the FFE resolution for the transmitter output driver.

10. A source-series terminated (SST) transmitter comprising:
an output stage driver comprising a plurality of parallel-connected output driver slices coupled to a data communication link;
a multiple-tap feed forward equalization (FFE) unit comprising at least one pre-cursor tap, main tap, or and post-cursor tap; and
an impedance tuning and FFE control component configured for both implementing impedance tuning and implementing FFE resolution, where the impedance tuning comprises performing fine impedance tuning and coarse impedance tuning within each of the plurality of parallel-connected output driver slices; and where implementing the FFE resolution for the output stage driver comprises performing FFE resolution on the parallel-connected output driver slices by assigning respective ones of the plurality of parallel-connected output driver slices to a specific FFE tap of the at least one pre-cursor tap, main tap or post-cursor tap of the multiple-tap FFE unit.

11. The SST transmitter of claim 10, wherein performing the fine impedance tuning comprises applying control code to control a set of output driver header and footer devices of each output driver slice, wherein the controlled output driver header and footer devices are fully turned on or off.

12. The SST transmitter of claim 10, wherein each output driver slice comprises a plurality of parallel scaled voltage mode driver stages within each driver slice and wherein performing the coarse impedance tuning comprises applying a control code to binary weighted groups of the parallel scaled voltage mode driver stages within the driver slice.

13. The SST transmitter of claim 10, wherein performing the fine impedance tuning and the coarse impedance tuning within each of the plurality of parallel-connected output driver slices is separate and independent from performing the FFE resolution on the parallel-connected output driver slices.

14. The SST transmitter of claim 10, wherein the output stage driver includes a set number of the parallel-connected output driver slices and wherein both the impedance tuning and the FFE resolution are independent and separately performed on the set number of the parallel-connected output driver slices, with each of the parallel-connected output driver slices enabled.

15. The SST transmitter of claim 10, wherein the SST transmitter comprises a segmented multiple level SST transmitter configured to transmit a functional serial data stream to the data communication link with a Pulse Amplitude Modulation, 4 Levels (PAM4) signal modulation format.

16. A method comprising:
providing (i) a segmented multiple level source-series terminated (SST) transmitter comprising an output driver comprising a plurality of parallel-connected output driver slices coupled to a data communication link and (ii) a multiple-tap feed forward equalization (FFE) unit comprising at least one pre-cursor tap, main tap, or post-cursor tap;
performing impedance tuning within each of the plurality of parallel-connected output driver slices of the output driver; and
performing FFE resolution on the plurality of parallel-connected output driver slices of the output driver by assigning respective ones of the plurality of parallel-connected output driver slices to a specific FFE tap of the at least one pre-cursor tap, main tap or post-cursor tap of the multiple-tap FFE unit, wherein the segmented multiple level SST transmitter transmits a functional serial data stream with a Pulse Amplitude Modulation, 4 Levels (PAM4) signal modulation format to the data communication link after completing the impedance tuning and the FFE resolution for the output driver.

17. The method of claim 16, wherein performing impedance tuning within each of the plurality of parallel-connected output driver slices of the output driver comprises performing fine impedance tuning and coarse impedance tuning, and wherein performing the fine impedance tuning comprises applying a control code to control a set of output driver header and footer devices of each output driver slice.

18. The method of claim 17, wherein each of the plurality of parallel-connected output driver slices comprises a plurality of parallel scaled voltage mode driver stages and wherein performing the coarse impedance tuning comprises applying the control code to binary weighted groups of the parallel scaled voltage mode driver stages within each of the plurality of parallel-connected output driver slices.

19. The method of claim 16, wherein the output stage driver includes a set number of the parallel-connected output driver slices and wherein performing the impedance tuning and performing the FFE resolution are separately performed on the set number of the parallel-connected output driver slices, with each of the parallel-connected output driver slices enabled.

* * * * *